(12) United States Patent
Bai et al.

(10) Patent No.: US 12,160,017 B2
(45) Date of Patent: Dec. 3, 2024

(54) SECONDARY BATTERY, BATTERY MODULE, AND APPARATUS

(71) Applicant: CONTEMPORARY AMPEREX TECHNOLOGY (HONG KONG) LIMITED, Hong Kong (CN)

(72) Inventors: Qinglin Bai, Ningde (CN); Zhiyang Wu, Ningde (CN); Shan Gao, Ningde (CN); Chunyang Peng, Ningde (CN); Lingyan Jiang, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 357 days.

(21) Appl. No.: 17/712,084

(22) Filed: Apr. 2, 2022

(65) Prior Publication Data

US 2022/0223979 A1 Jul. 14, 2022

Related U.S. Application Data

(63) Continuation of application No. PCT/CN2020/128472, filed on Nov. 12, 2020.

(30) Foreign Application Priority Data

May 15, 2020 (CN) .......................... 202020819152.5

(51) Int. Cl.
*H01M 50/474* (2021.01)
*H01M 10/04* (2006.01)
(Continued)

(52) U.S. Cl.
CPC ..... *H01M 50/474* (2021.01); *H01M 10/0422* (2013.01); *H01M 50/107* (2021.01); *H01M 50/477* (2021.01); *H01M 50/531* (2021.01)

(58) Field of Classification Search
CPC ............. H01M 50/474; H01M 50/107; H01M 50/531; H01M 50/477; H01M 10/0422
See application file for complete search history.

(56) References Cited

U.S. PATENT DOCUMENTS

2014/0087225 A1* 3/2014 Zhang ................. H01M 50/536
29/17.2

FOREIGN PATENT DOCUMENTS

| CN | 202905891 U | 4/2013 |
| CN | 102576829 B | 10/2014 |

(Continued)

OTHER PUBLICATIONS

JP2000077078 translation (Year: 2000).*
(Continued)

*Primary Examiner* — Jane J Rhee
(74) *Attorney, Agent, or Firm* — East IP P.C.

(57) ABSTRACT

The present application relates to a secondary battery, a battery module and an apparatus. The secondary battery includes an electrode assembly and a casing. The electrode assembly includes a main body portion and a tab portion, the tab portion extending out from the main body portion along an end of the main body portion and including an outer peripheral surface. The casing includes an accommodating hole for accommodating the electrode assembly. The casing includes a limiting protrusion. The outer peripheral surface extends around an axis of the accommodating hole. The limiting protrusion protrudes toward the tab portion and presses against the outer peripheral surface of the tab portion. The limiting protrusion is adapted to limit a position of the tab portion. The secondary battery provided by the present application can reduce the possibility of fatigue fracture of the adapting piece.

17 Claims, 7 Drawing Sheets

(51) Int. Cl.
*H01M 50/107* (2021.01)
*H01M 50/477* (2021.01)
*H01M 50/531* (2021.01)

(56) References Cited

FOREIGN PATENT DOCUMENTS

| | | |
|---|---|---|
| CN | 207265108 U | 4/2018 |
| CN | 110600795 A | 12/2019 |
| JP | H11354083 A | 12/1999 |
| JP | 2000077078 A | 3/2000 |
| JP | 2000164257 A | 6/2000 |
| JP | 2001126686 A | 5/2001 |
| JP | 2001257002 A | 9/2001 |
| JP | 2012518 890 A | 8/2012 |
| JP | 2015092456 A | 5/2015 |

OTHER PUBLICATIONS

The International search report for PCT Application No. PCT/CN2020/128472, dated Feb. 20, 2021, 11 pages.
The First Office Action for JP Application No. 2022-541789, dated Aug. 21, 2023, 8 pages.
The extended European search report for European Application No. 20935498.4, dated May 10, 2023, 9 pages.

* cited by examiner

SECONDARY BATTERY, BATTERY MODULE, AND APPARATUS

CROSS REFERENCE TO RELATED APPLICATION

This application is a continuation of PCT Application No. PCT/CN2020/128472 filed on Nov. 12, 2020, which claims priority to Chinese Patent Application No. 202020819152.5, tilted "SECONDARY BATTERY, BATTERY MODULE AND APPARATUS" and filed on May 15, 2020, both of which are hereby incorporated by reference in their entireties.

TECHNICAL FIELD

The present disclosure relates to a technical field of battery, and particularly relates to a secondary battery, a battery module and an apparatus.

BACKGROUND

With the development of science and technology, the application of rechargeable secondary batteries has become more and more extensive, and for example, the secondary batteries can be used in automobiles, electric bicycles, or wireless electric tools. The secondary battery includes a casing, an electrode assembly disposed in the casing, a cap cover connected with the casing, an electrode terminal disposed on the cap cover, and an adapting piece for connecting the electrode assembly and the electrode terminal. In some cases, the adapting piece may be fractured during the use of the secondary battery, which affects the service life of the secondary battery.

SUMMARY

The present disclosure provides a secondary battery, a battery module and an apparatus. The secondary battery can reduce the possibility of fatigue fracture of the adapting piece.

On one aspect, the present application provides a secondary battery, including:

an electrode assembly and a casing. The electrode assembly includes a main body portion and a tab portion, the tab portion extending out from the main body portion along an end of the main body portion and including an outer peripheral surface. The casing includes an accommodating hole for accommodating the electrode assembly. The casing includes a limiting protrusion. The outer peripheral surface extends around an axis of the accommodating hole. The limiting protrusion protrudes toward the tab portion and presses against the outer peripheral surface of the tab portion. The limiting protrusion is adapted to limit a position of the tab portion.

According to one embodiment of the present application, the electrode assembly further includes an insulating member, and at least part of the insulating member is disposed between the limiting protrusion and the tab portion.

According to one embodiment of the present application, the insulating member is wound into a tubular member along a circumferential direction of the accommodating hole to cover an outer peripheral surface of the electrode assembly.

According to one embodiment of the present application, a part of the insulating member extends beyond the tab portion in an axial direction of the accommodating hole.

According to one embodiment of the present application, the insulating member is formed as a sheet-like member.

According to one embodiment of the present application, the tab portion includes a first portion and a second portion, the second portion is connected to the main body portion, the tab portion is formed as a structure of multiple layers, a gap between two adjacent layers is smaller in the first portion than in the second portion, and the limiting protrusion presses against the second portion.

According to one embodiment of the present application, a surface of the limiting protrusion pressing against the tab portion is a smooth curved surface.

According to one embodiment of the present application, the limiting protrusion has a cross section in a shape of an arc or a triangle.

According to one embodiment of the present application, a surface of the limiting protrusion pressing against the tab portion is a flat surface.

According to one embodiment of the present application, the limiting protrusion has a cross section in a trapezoidal shape.

According to one embodiment of the present application, a portion of the casing is recessed toward the tab portion to form the limiting protrusion.

According to one embodiment of the present application, the limiting protrusion is formed in an annular shape, and the limiting protrusion is arranged around the tab portion.

According to one embodiment of the present application, the casing further includes a tubular body, the tubular body is sleeved on an outside of the limiting protrusion and is in an interference fit with the limiting protrusion.

According to one embodiment of the present application, two or more limiting protrusions are provided, and the two or more limiting protrusions are arranged at intervals around the tab portion.

According to one embodiment of the present application, the secondary battery further includes a cap member, the cap member includes a first disc body and a second disc body, the first disc body has a diameter larger than that of the second disc body, and an edge of the first disc body extending beyond the second disc body overlaps an end surface of the casing and is welded with the casing.

According to one embodiment of the present application, the casing is formed as a tubular structure and includes two openings, two cap members are provided, and the two cap members are respectively disposed on two ends of the casing to cover and close the respective openings.

According to one embodiment of the present application, the casing is formed as a cylindrical member.

The secondary battery according to the embodiment of the present application includes a casing and an electrode assembly provided in the casing. The casing includes a limiting protrusion protruding toward the tab portion. The limiting protrusion presses against the outer peripheral surface of the tab portion, so that the limiting protrusion limits the position of the tab portion. As such, when the secondary battery is vibrated or impacted, the limiting protrusion can limit the position of the tab portion to prevent the tab portion from bending, thereby reducing the compressed amount of the tab portion, thus reducing the possibility of fatigue fracture of the adapting piece due to displacement of the electrode assembly and increasing the service life of the secondary battery.

On a further aspect, the present application provides a battery module, including a housing and the secondary battery as described above. The secondary battery is disposed in the housing.

On another further aspect, the present application provides an apparatus using a secondary battery as a power source, the apparatus includes the secondary battery as described above, and the secondary battery is adapted to provide electrical energy.

BRIEF DESCRIPTION OF THE DRAWINGS

In order to more clearly describe the technical solutions of the embodiments of the present application, the accompanying drawings that need to be used in the embodiments of the present application will be briefly introduced below; obviously, the accompanying drawings described below are only some implementations of the present application, and for the person skilled in the art, other drawings can be obtained based on the described accompanying drawings without expending creative labors.

In the drawings, the drawings may not be drawn to an actual scale.

REFERENCE NUMERALS 1, vehicle; 10, battery module; 20, housing; 30, secondary battery; 31, casing; 31a, accommodating hole; 31aa, axis; 311, limiting protrusion; 312, tubular body; 32, cap member; 321, the first disc body; 322, second disc body; 33, electrode assembly; 331, main body portion; 332, tab portion; 3321, outer peripheral surface; 3322, end surface; 332a, first portion; 332b, second portion; 333, insulating member; 34, electrode terminal; 35, adapting piece; 40, separating plate; 99, channel; X, axial direction.

DETAILED DESCRIPTION

The implementations of the present application are described below in further detail with reference to the accompanying drawings and embodiments. The following detailed description of the embodiments and the accompanying drawings are used to exemplarily illustrate the principle of the present application, but cannot be used to limit the scope of the present application, that is, the present application is not limited to the described embodiments.

In the description of the present application, it should be noted that, unless otherwise stated, "multiple" means two or more; the orientation or positional relationship indicated by the terms "upper", "lower", "left", "right", "inside", "outside" or the like is merely used for convenience of describing the application and simplifying the description, rather than indicating or implying that the device or element referred to must have a particular orientation, or be constructed and operated in a particular orientation, and therefore cannot be understood as a limitation to the present application. In addition, the terms "first", "second", "third", or the like are only used for descriptive purposes, and cannot be understood as indicating or implying relative importance. "Perpendicularity" does not mean a strict perpendicularity, but allows an error within an allowed range. "Parallel" does not mean a strict parallel but allows an error within an allowed range.

The orientation words appearing in the following description all refer to the directions shown in the drawings, and are not intended to define the specific structure of the present application. In the description of the present application, it should also be noted that, unless otherwise clearly defined and specified, the terms "install", "connect", and "couple" should be understood in a broad sense, for example, may refer to a fixed connection, a detachable connection, or an integral connection, may refer to a direct connection or an indirect connection through an intermediate medium. For the person skilled in the art, the specific meaning of the above-mentioned terms in the present application can be understood according to specific circumstances.

When solving the problem of fracture of the adapting piece in the secondary battery in related technologies, Applicant optimized the thickness of the adapting piece to improve the overall strength. But after using a period of time, the fracture of the adapting piece may still occur. Therefore, Applicant conducted further research and analysis on various components of the secondary battery, and found that since the adapting piece is arranged between the electrode terminal and the electrode assembly, when the secondary battery is vibrated or impacted, the electrode assembly tends to displace close to or away from the electrode terminal, causing the tab to be stressed. The tab will bend after being stressed, causing size of the electrode assembly to become smaller and displacement space between the electrode assembly and the cap cover to be increased, and thus the electrode assembly is easy to displace relative to the casing. The adapting piece will be compressed and stretched many times under the driving of the electrode assembly, resulting in local fatigue fracture of the adapting piece.

Based on the above-mentioned problem found by Applicant, Applicant improved the configuration of the secondary battery, and the embodiments of the present application are further described below.

In order to better understand the present application, the embodiments of the present application are described below in combination with FIG. 1 to FIG. 13.

Figure 1:
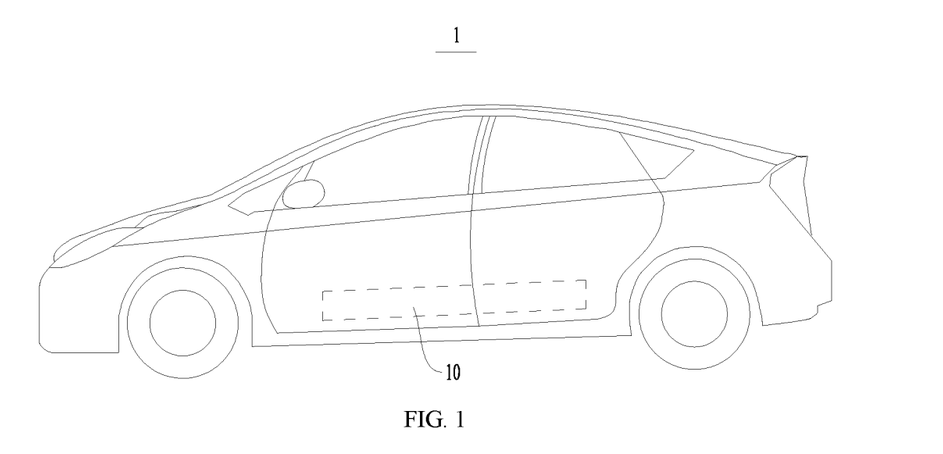
FIG. 1 is a schematic structural diagram of a vehicle disclosed in an embodiment of the present application.

Referring to FIG. 1, an embodiment of the present application provides an apparatus that uses a battery module 10 as a power source. The apparatus can be, but is not limited to, a vehicle, a ship, an aircraft, an electric tool, or the like.

One embodiment of the present application provides a vehicle 1 including a vehicle body and a battery module 10. The battery module 10 is disposed on the vehicle body. The vehicle 1 may be a pure electric vehicle, a hybrid electric vehicle or an extended-range vehicle. The vehicle body is provided with a drive motor electrically connected with the battery module 10. The battery module 10 provides electric energy to the drive motor. The drive motor is connected to wheels on the vehicle body through a transmission mechanism to drive the vehicle to travel. Optionally, the battery module 10 may be horizontally disposed at the bottom of the vehicle body.

Figure 2:
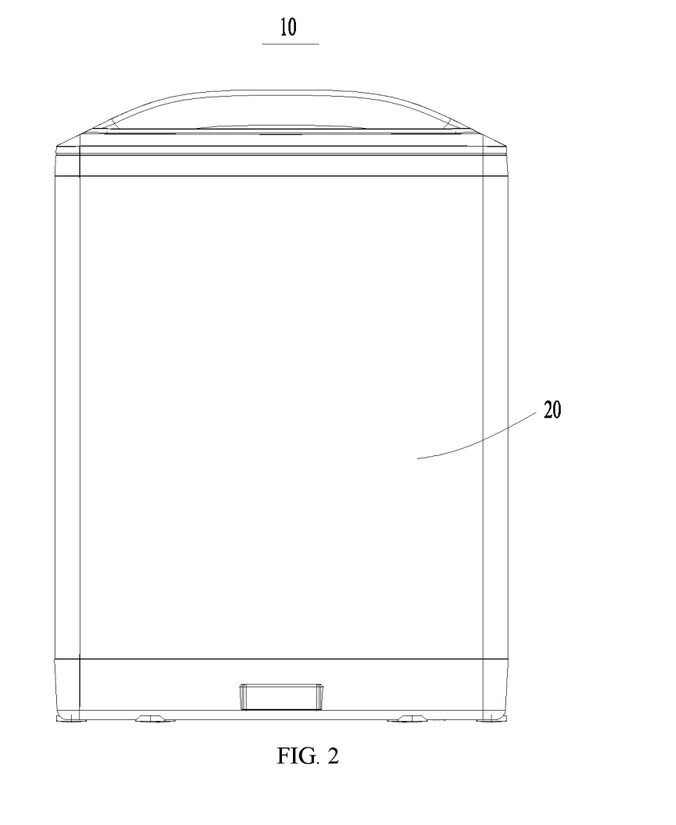
FIG. 2 is a schematic structural diagram of a battery module disclosed in an embodiment of the present application.
Figure 3:
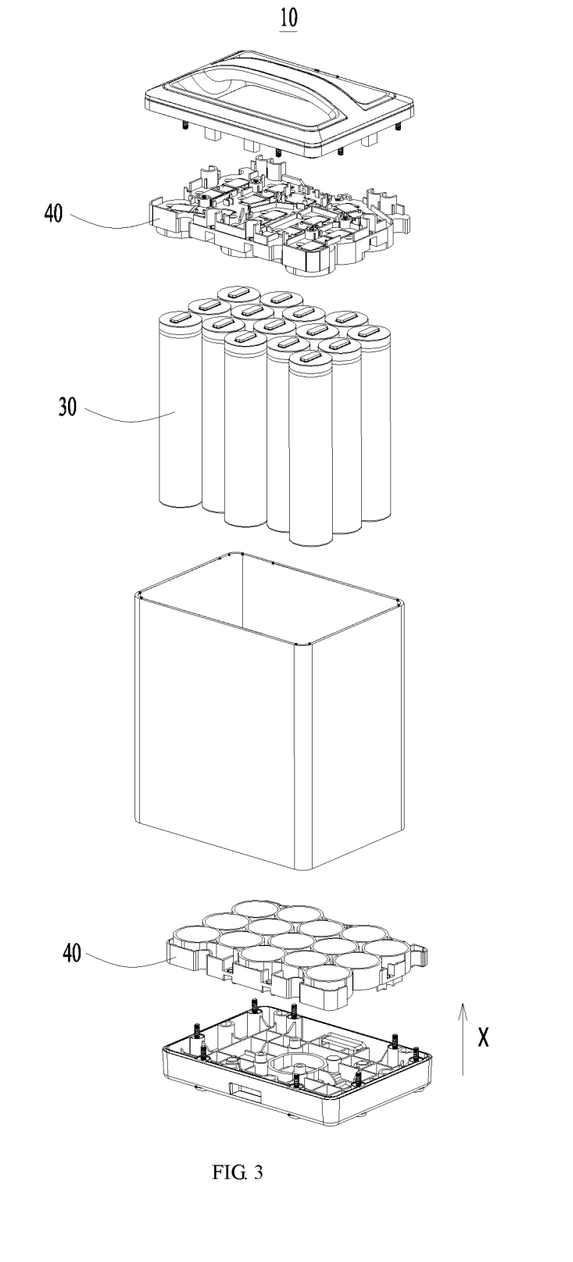
FIG. 3 is an explosive schematic diagram of a structure of the battery module of the embodiment shown in FIG. 2.

In an embodiment of the present application, referring to FIG. 2 and FIG. 3, the battery module 10 includes a housing 20, a secondary battery 30, and a separating plate 40. There may be multiple secondary batteries 30 provided in the housing 20. The multiple secondary batteries 30 may be connected in series or in parallel with each other through a busbar (not shown in the drawings). The separating plate 40 is disposed between the housing 20 and the secondary batteries 30. Two separating plates 40 are respectively disposed corresponding to two ends of the respective secondary batteries 30 and can compress the respective secondary batteries 30 so as to limit the positional displacement of the respective secondary batteries 30. The separating plate 40 can insulate and isolate the secondary batteries 30 and other adjacent structural components, such as busbars, circuit boards, or wiring harnesses, thereby improving the safety of use of the secondary battery 30. In one example, the separating plate 40 is an injection molded integral member. The housing 20 in the embodiment of the present application is formed in a square shape or in other shapes. The housing 20 may be made of materials such as aluminum, aluminum alloy, or plastic.

Figure 4:
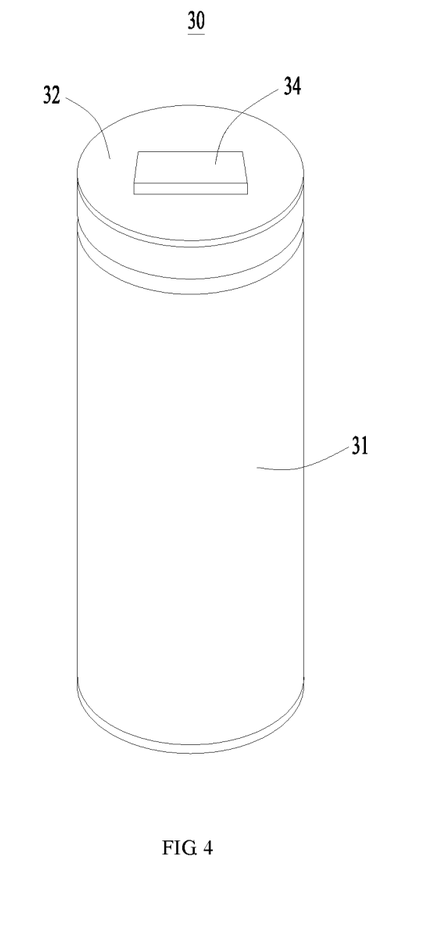
FIG. 4 is a schematic structural diagram of a secondary battery disclosed in an embodiment of the present application.
Figure 5:
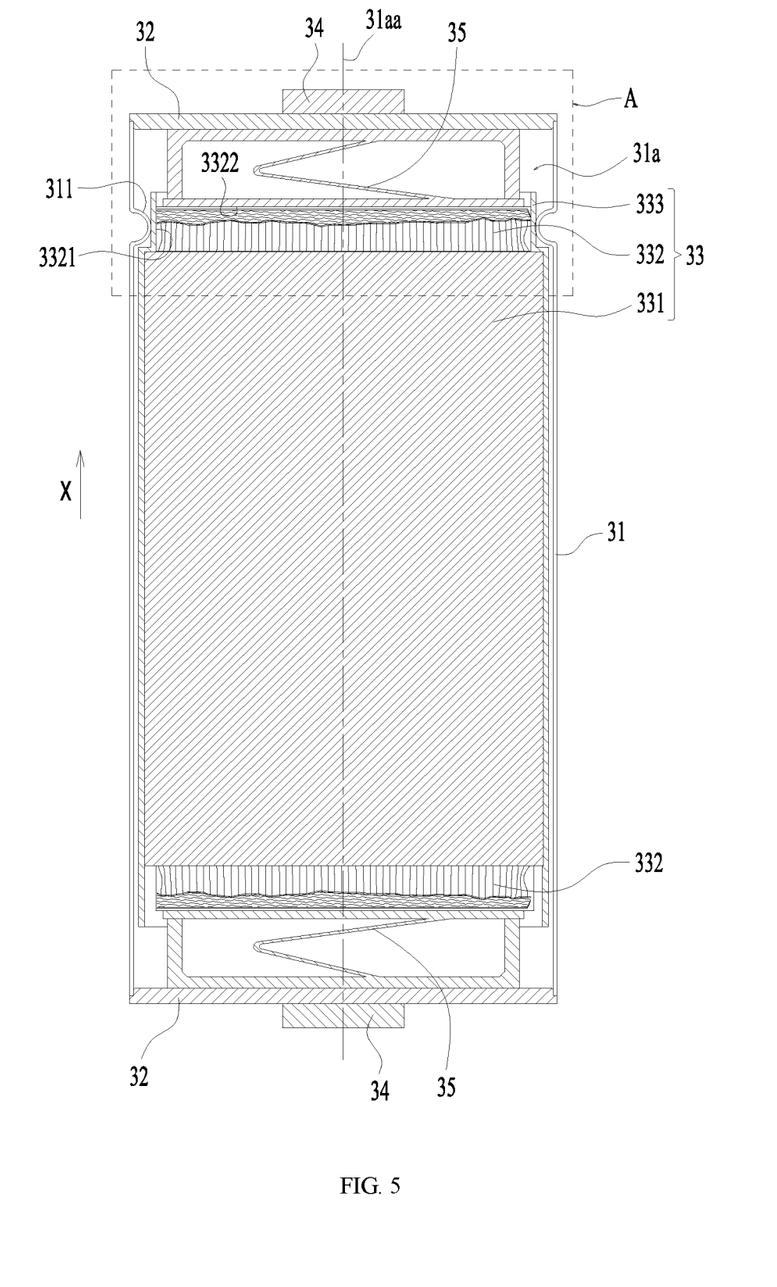
FIG. 5 is a schematic cross-sectional view of the secondary battery of the embodiment shown in FIG. 4.

Referring to FIG. 4 and FIG. 5, the secondary battery 30 includes a casing 31, a cap member 32 connected to the casing 31 in a sealed manner, an electrode assembly 33 disposed in the casing 31, an electrode terminal 34 provided on the cap member 32, and an adapting piece 35 for connecting the electrode assembly 33 with the electrode terminal 34.

The casing 31 according to an embodiment of the present application is formed as a cylindrical member. It can be understood that the casing 31 may be formed in a square shape or in other shapes. The casing 31 includes an accommodating hole 31a for accommodating the electrode assembly 33 and electrolyte, and an opening communicating with the accommodating hole 31a. The accommodating hole 31a may be a circular hole or a square hole. The accommodating hole 31a may be a through hole or a blind hole. The electrode assembly 33 may be mounted into the accommodating hole 31a through the opening. The casing 31 may be made of materials such as aluminum, aluminum alloy, or plastic.

The cap member 32 according to the embodiment of the present application is formed as a plate-like member. The cap member 32 can cover and close the opening of the casing 31 and is connected with the casing 31 in a sealed manner. The electrode terminal 34 is adapted to be welded with the busbar. In one embodiment, the casing 31 is formed as a tubular structure and includes two openings. Two cap members 32 are provided. The two cap members 32 are respectively disposed on two ends of the casing 31 to cover and close the corresponding openings. Two electrode terminals 34 with opposite polarities are respectively disposed on the corresponding cap members 32. In one example, the cap member 32 includes a first disc body 321 and a second disc body 322. The first disc body 321 has a diameter greater than that of the second disc body 322. An edge of the first disc body 321 that extends beyond the second disc body 322 overlaps the end surface of the casing 31 and is welded to the casing 31. The end of the casing 31 is formed in a straight tubular shape.

The electrode assembly 33 according to the embodiment of the present application may include a main body portion 331 formed by winding a first electrode plate, a second electrode plate and a separator disposed between the first electrode plate and the second electrode plate, wherein the separator is an insulator interposed between the first electrode plate and the second electrode plate. The main body portion 331 includes two ends opposite each other along an axial direction X of the accommodating hole 31a. In the present embodiment, the description is made by exemplarily taking the first electrode plate as a positive electrode plate and taking the second electrode plate as a negative electrode plate. Active material of the positive electrode plate is coated on a coating region of the positive electrode plate, and active material of the negative electrode plate is coated on a coating region of the negative electrode plate. The main body portion 331 is formed by the coating regions, and the uncoated regions extending out from the main body portion 331 forms a tab portion 332. The electrode assembly 33 includes two tab portions 332, namely, a positive tab portion and a negative tab portion. The positive tab portion extends out from the coating region of the positive electrode plate, and the negative tab portion extends out from the coating region of the negative electrode plate. In the embodiment of the present application, the two tab portions 332 extends out from the two ends opposite each other of the main body portion 331 respectively. The tab portions 332 are connected to the electrode terminals 34 of the same polarities respectively. Each tab portion 332 includes an outer peripheral surface 3321 and an end surface 3322. The outer peripheral surface 3321 extends in a circumferential direction of the accommodating hole 31a, that is, extends around an axis 31aa of the accommodating hole 31a. The end surface 3322 is perpendicular to the axial direction X of the accommodating hole 31a. The adapting piece 35 is connected to the end surface 3322.

The casing 31 according to the embodiment of the present application is adapted to accommodate the electrode assembly 33. The casing 31 includes a limiting protrusion 311. The limiting protrusion 311 protrudes toward the tab portion 332 and presses against the outer peripheral surface 3321 of the tab portion 332. The limiting protrusion 311 is adapted to limit a position of the tab portion 332. Here, the "presses" means that the limiting protrusion 311 exerts a predetermined compressive stress on the outer peripheral surface 3321 of the tab portion 332. The direction of the compressive stress is directed to a center of the tab portion 332 in a radial direction of the accommodating hole 31a. The radial direction of the accommodating hole 31a is perpendicular to the axial direction X of the accommodating hole 31a.

The secondary battery 30 according to the embodiment of the present application includes a casing 31 and an electrode assembly 33 disposed in the casing 31. The casing 31 includes a limiting protrusion 311 protruding toward the tab portion 332. The limiting protrusion 311 presses against the outer peripheral surface 3321 of the tab portion 332, so that the limiting protrusion 311 limits the position of the tab portion 332. As such, when the secondary battery 30 is vibrated or impacted, the tab portion 332 does not tend to expand and deform in the radial direction of the accommodating hole 31a under the limiting in position provided by the limiting protrusion 311, and thus the possibility that the tab portion 332 becomes smaller in the axial direction X of the accommodating hole 31a, that is, is pressed in the axial direction X of the accommodating hole 31a to become flatter, due to that the electrode assembly 33 displaces and is subjected to a reaction force from the adapting piece 35, is reduced. If the tab portion 332 becomes flatter in the axial direction X of the accommodating hole 31a, the displacement amount of the electrode assembly 33 in the axial direction X of the accommodating hole 31a will become larger, and the deformation amount of the adapting piece 35 will become larger due to the displacement of the electrode assembly 33, making it easier for the adapting piece 35 to reach a fatigue fracture limit. Further, the limiting protrusion 311 can limit the electrode assembly 33 from displacing along the axial direction X of the accommodating hole 31a through the tab portion 332, thereby reducing the possibility of fatigue fracture of the adapting piece 35 caused by the repeat compressing and stretching applied by the adapting piece due to the displacement of the electrode assembly 33, and thus improving the safety of use of the secondary battery 30 and increasing the service life of the secondary battery 30.

Figure 6:
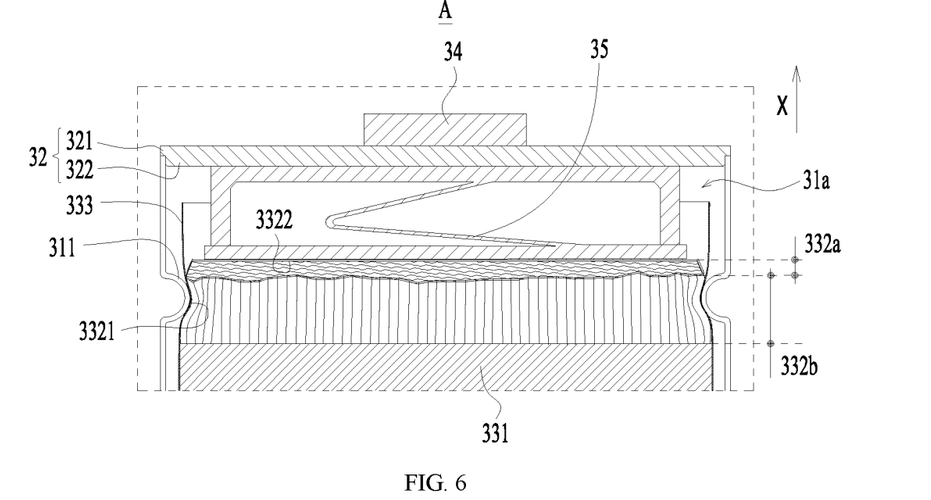
FIG. 6 is an enlarged view of portion A in FIG. 5.

In one embodiment, referring to FIG. 6, the electrode assembly 33 further includes an insulating member 333. The insulating member 333 is wound into a tubular member along the circumferential direction of the accommodating hole 31a to cover an outer peripheral surface of the electrode assembly 33. At least part of the insulating member 333 is disposed between the limiting protrusion 311 and the tab portion 332, so that the insulating member 333 can isolate the limiting protrusion 311 from the tab portion 332. In the axial direction X of the accommodating hole 31a, a part of the insulating member 333 extends beyond the tab portion 332. The insulating member 333 may be formed as a sheet-like member.

In one embodiment, referring to FIG. 6, the tab portion 332 according to the embodiment of the present application is formed as a structure of multiple layers. During the manufacturing process of the electrode assembly 33, the tab portion 332 will undergo a flattening process by a flattening device. The tab portion 332 after the flattening process includes a first portion 332a and a second portion 332b. A gap between two adjacent layers is smaller in the first portion 332a than in the second portion 332b, so that the two adjacent layers are relatively dense in the first portion 332a, while are relatively sparse in the second portion 332b. The second portion 332b of the tab portion 332 is connected to the main body portion 331, while the first portion 332a is disposed away from the main body portion 331. Since the second portion 332b is relatively sparse, when the electrode assembly 33 displaces and is subjected to the reaction force from the cap member 34 or other components, the tab portion 332 is more likely to be bent and deformed in the second portion 332b and expand in size along the radial direction of the accommodating hole 31a. In the present embodiment, the limiting protrusion 311 presses against the outer peripheral surface 3321 of the tab portion 332 at a region corresponding to the second portion 332b, and can provide a lateral support to the second portion 332b of the tab portion 332, so that the second portion 332b is unlikely to be bent and deformed when the tab portion 332 is pressed by an external force, thereby reducing the possibility that the tab portion 332 becomes smaller in the axial direction X of the accommodating hole 31a due to the pressing of the external force.

In one embodiment, referring to FIG. 6, a surface of the limiting protrusion 311 pressing against the tab portion 332 is a smooth curved surface, to reduce the possibility that a local stress concentration appears in the tab portion 332 due to the pressing of the limiting protrusion 311 against the tab portion 332, thereby reducing the possibility that structural damage such as cracks occurs in the tab portion 332 due to the local stress concentration. Optionally, the surface of the limiting protrusion 311 pressing against the tab portion 332 is an arc surface.

In one embodiment, a portion of the casing 31 is recessed toward the tab portion 332 to form the limiting protrusion 311 to ensure an integrity and structural strength of the casing 31. A recessed portion is formed on the casing 31 in a region corresponding to the limiting protrusion 311. The limiting protrusion 311 has a cross section in a shape of an arc, which is beneficial to reduce the possibility of cracks appearing in the region where the limiting protrusion 311 is formed due to excessive tensile stress. In one example, after the electrode assembly 33 and the casing 31 are assembled, the casing 31 is rolled on an outside of the casing 31 by a roller press to form the limiting protrusion 311.

In one embodiment, referring to FIG. 4 and FIG. 6, the limiting protrusion 311 is formed in an annular shape. The limiting protrusion 311 extends along the circumferential direction of the accommodating hole 31a and is disposed around the tab portion 332. The limiting protrusion 311 can provide the lateral support to the tab portion 332 through the entire outer peripheral surface 3321 of the tab portion 332, so that the tab portion 332 can be restricted and limited by the limiting protrusion 311 at various portions.

Figure 7:
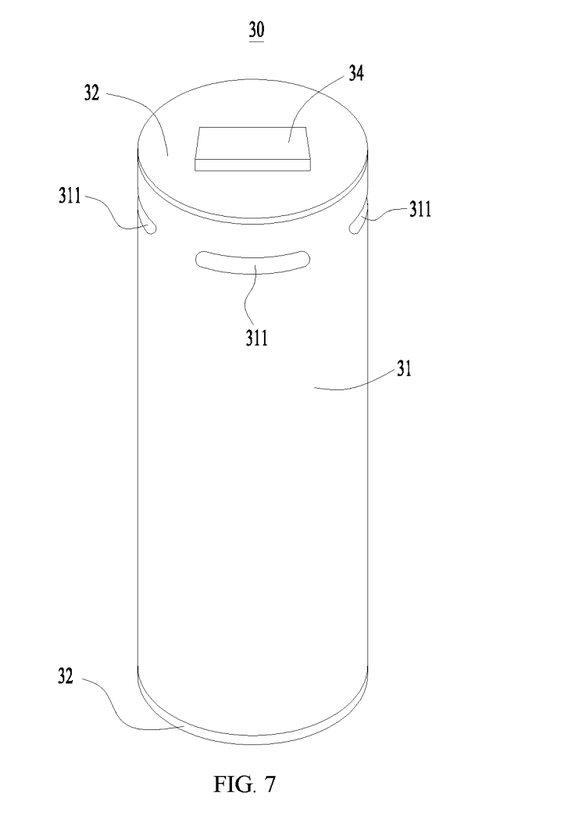
FIG. 7 is a schematic structural diagram of a secondary battery disclosed in another embodiment of the present application.
Figure 8:
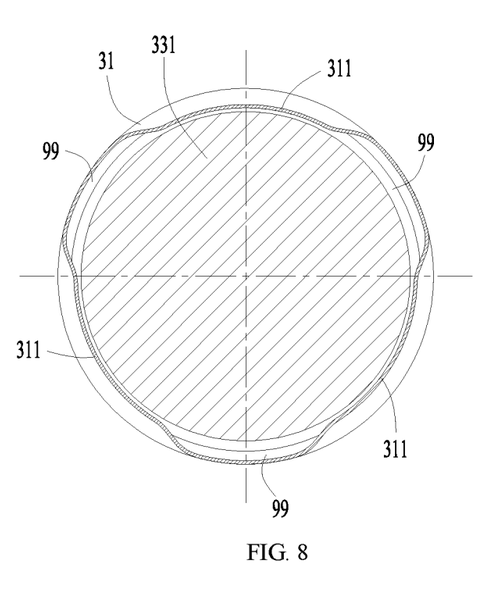
FIG. 8 is a schematic partial cross-sectional view of a structure of the secondary battery of the embodiment shown in FIG. 7.

In one embodiment, referring to FIG. 7 and FIG. 8, two or more limiting protrusions 311 are provided. The two or more limiting protrusions 311 are arranged at intervals around the tab portion 332. Optionally, the two or more limiting protrusions 311 are arranged at even intervals around the tab portion 332. A channel 99 is formed between two adjacent limiting protrusions 311, so that gas generated during use of the secondary battery 30 or the electrolyte injected into the secondary battery 30 can flow through the channels 99, so as to ensure normal use of the burst valve of the secondary battery 30 or consistency of the electrode assembly 33 being infiltrated with the electrolyte.

Figure 9:
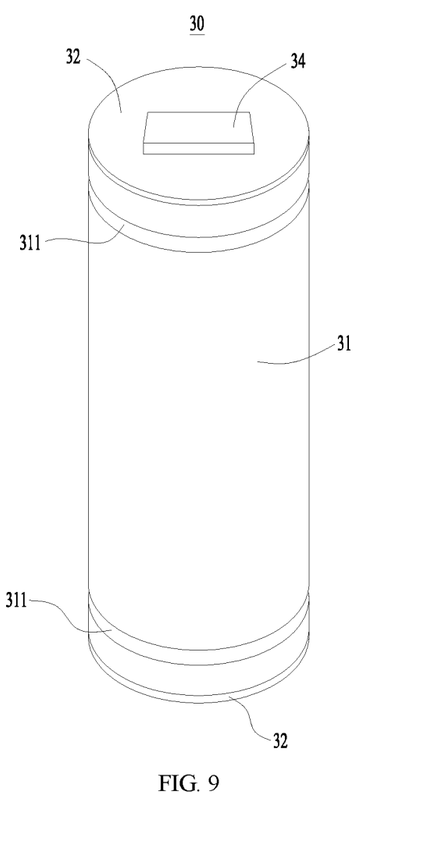
FIG. 9 is a schematic structural diagram of a secondary battery disclosed in a further embodiment of the present application.
Figure 10:
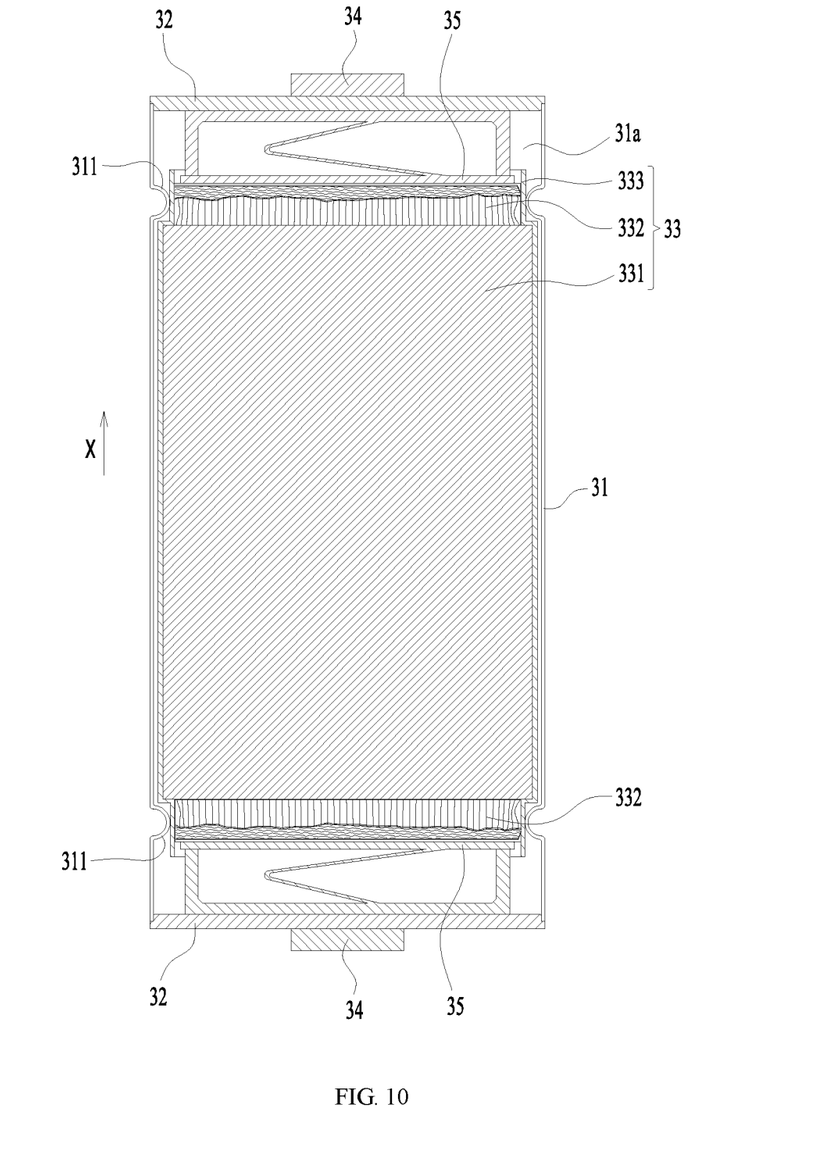
FIG. 10 is a schematic cross-sectional view of the secondary battery of the embodiment shown in FIG. 9.

In one embodiment, referring to FIG. 9 and FIG. 10, the secondary battery 30 of the present embodiment will be described mainly regarding the different aspects from the secondary battery 30 of the embodiment as shown in FIG. 4 and FIG. 5, with the same configurations not repeated here. In the present embodiment, the casing 31 includes two limiting protrusions 311. Each end of the casing 31 is provided with one limiting protrusion 311, so that the two limiting protrusions 311 respectively apply the compressive stress to the tab portions 332 on both sides of the main body portion 331 at the same time, which increases the restriction and limit to the electrode assembly 33, and further reduces the possibility of displacement of the electrode assembly 33 in the casing 31.

Figure 11:
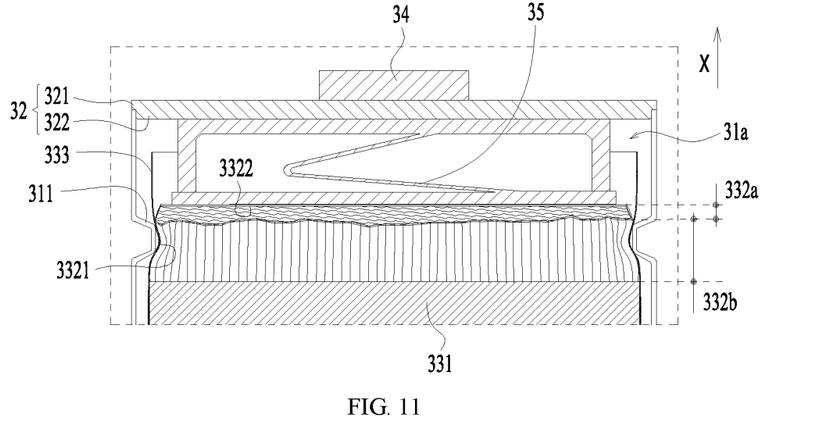
FIG. 11 is a schematic partial cross-sectional view of a structure of a secondary battery disclosed in another embodiment of the present application.

In one embodiment, referring to FIG. 11, the secondary battery 30 of the present embodiment will be described mainly regarding the different aspects from the secondary battery 30 of the embodiment as shown in FIG. 6, with the same configurations not repeated here. In the present embodiment, the limiting protrusion 311 has a cross section in a trapezoidal shape. A top surface of the limiting protrusion 311 pressing against the tab portion 322 is a flat surface, which reduces the possibility that a local stress concentration appears in the tab portion 332 due to the pressing of the limiting protrusion 311 against the tab portion 332, and thus reduces the possibility that the structural damage such as cracks occurs in the tab portion 332 due to the local stress concentration.

Figure 12:
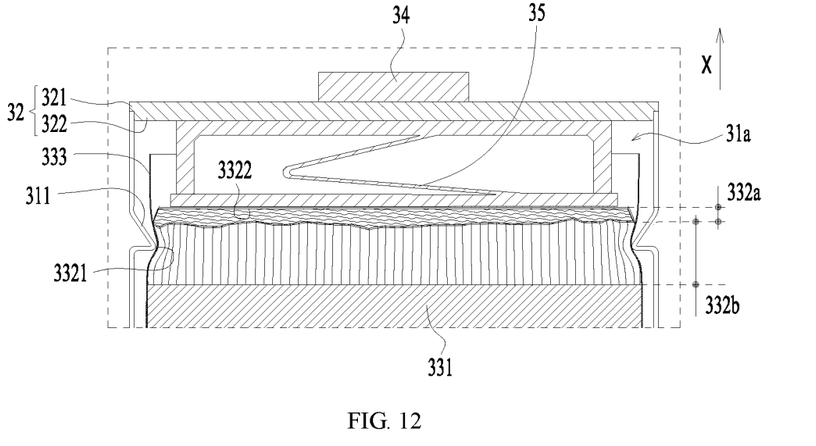
FIG. 12 is a schematic partial cross-sectional view of a structure of a secondary battery disclosed in a further embodiment of the present application.

In one embodiment, referring to FIG. 12, the secondary battery 30 of the present embodiment will be described mainly regarding the different aspects from the secondary battery 30 of the embodiment as shown in FIG. 6, with the same configurations not repeated here. In the present embodiment, the limiting protrusion 311 has a cross section in a triangular shape. A top surface of the limiting protrusion 311 pressing against the tab portion 322 is a smooth curved surface, which reduces the possibility that a local stress concentration appears in the tab portion 332 due to the pressing of the limiting protrusion 311 against the tab portion 332, and thus reduces the possibility that the structural damage such as cracks occurs in the tab portion 332 due to the local stress concentration.

Figure 13:
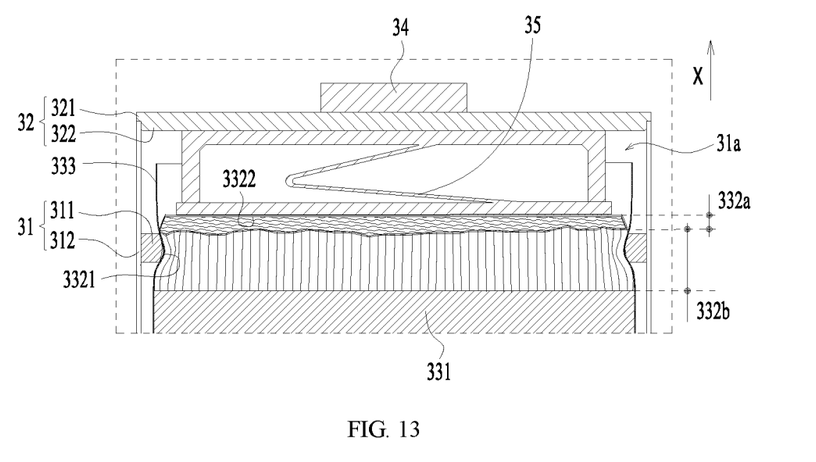
FIG. 13 is a schematic partial cross-sectional view of a structure of a secondary battery disclosed in another further embodiment of the present application.

In one embodiment, referring to FIG. 13, the secondary battery 30 of the present embodiment will be described mainly regarding the different aspects from the secondary battery 30 of the embodiment as shown in FIG. 6, with the same configurations not repeated here. In the present embodiment, the casing 31 further includes a tubular body 312. The tubular body 312 and the limiting protrusion 311 are formed separately, and then can be sleeved on and connected to each other. The tubular body 312 is sleeved on an outside of the limiting protrusion 311 and is in an interference fit with the limiting protrusion 311. The limiting protrusion 311 is formed as an annular member. The limiting protrusion 311 is sleeved on an outside of the tab portion 332 in advance and presses against the outer peripheral surface 3321 of the tab portion 332. Then, the limiting protrusion 311 and the electrode assembly 33 are both assembled into the tubular body 312.

The secondary battery 30 according to the embodiments of the present application includes a casing 31 and an electrode assembly 33 received in the casing 31. The casing 31 includes a limiting protrusion 311. The limiting protrusion 311 can press against the outer peripheral surface 3321 of the tab portion 332 to exert a compressive stress to the tab portion 332, so that the limiting protrusion 311 can restrict and limit the position of the electrode assembly 33 through the tab portion 332, and reduce the possibility of displacement of the electrode assembly 33 in the casing 31, thereby reducing the possibility that the electrode assembly 33 displaces and repeatedly compresses and stretches the adapting piece 35 and thus causes the fatigue fracture of the adapting piece 35, which is beneficial to improve the safety of use of the secondary battery 30 and increase the service life of the secondary battery 30.

Although the present application has been described with reference to the optional embodiments, various improvements can be made to the present application and the components therein can be replaced with equivalents, without departing from the scope of the present application. In particular, as long as there is no structural conflict, various technical features mentioned in the various embodiments can be combined in any manner. The present application is not limited to the specific embodiments disclosed in the context, but includes all technical solutions falling within the scope of the claims.

What is claimed is:

1. A secondary battery, comprising:
an electrode assembly comprising a main body portion and a tab portion, the tab portion extending out from the main body portion along an end of the main body portion and comprising an outer peripheral surface;
a casing comprising an accommodating hole for accommodating the electrode assembly, the casing comprising a limiting protrusion, the outer peripheral surface extending around an axis of the accommodating hole, the limiting protrusion protruding toward the tab portion and pressing against the outer peripheral surface, and the limiting protrusion being adapted to limit a position of the tab portion,
wherein the electrode assembly further comprises an insulating member, and at least part of the insulating member is disposed between the limiting protrusion and the tab portion, and
the tab portion comprises a first portion and a second portion which are formed by performing a flattening process on the tab portion, the first portion is disposed away from the main body portion, the second portion is connected to the main body portion, the tab portion is formed as a structure of multiple layers, a gap between two adjacent layers is smaller in the first portion than in the second portion, and the limiting protrusion presses against the second portion.

2. The secondary battery according to claim 1, wherein the insulating member is wound into a tubular member along a circumferential direction of the accommodating hole to cover an outer peripheral surface of the electrode assembly.

3. The secondary battery according to claim 1, wherein a part of the insulating member extends beyond the tab portion in an axial direction of the accommodating hole.

4. The secondary battery according to claim 1, wherein the insulating member is formed as a sheet-like member.

5. The secondary battery according to claim 1, wherein a surface of the limiting protrusion pressing against the tab portion is a smooth curved surface.

6. The secondary battery according to claim 5, wherein the limiting protrusion has a cross section in a shape of an arc or a triangle.

7. The secondary battery according to claim 1, wherein a surface of the limiting protrusion pressing against the tab portion is a flat surface.

8. The secondary battery according to claim 7, wherein the limiting protrusion has a cross section in a trapezoidal shape.

9. The secondary battery according to claim 1, wherein a portion of the casing is recessed toward the tab portion to form the limiting protrusion.

10. The secondary battery according to claim 1, wherein the limiting protrusion is formed in an annular shape, and the limiting protrusion is arranged around the tab portion.

11. The secondary battery according to claim 10, wherein the casing further comprises a tubular body, the tubular body is sleeved on an outside of the limiting protrusion and is in an interference fit with the limiting protrusion.

12. The secondary battery according to claim 1, wherein two or more limiting protrusions are provided, and the two or more limiting protrusions are arranged at intervals around the tab portion.

13. The secondary battery according to claim 1, wherein the secondary battery further comprises a cap member, the cap member comprises a first disc body and a second disc body, the first disc body has a diameter larger than that of the second disc body, and an edge of the first disc body extending beyond the second disc body overlaps an end surface of the casing and is welded with the casing.

14. The secondary battery according to claim 13, wherein the casing is formed as a tubular structure and comprises two openings, the secondary battery comprises two cap members and the two cap members are respectively disposed on two ends of the casing to cover and close the respective openings.

15. The secondary battery according to claim 1, wherein the casing is formed as a cylindrical member.

16. A battery module, comprising:
a housing;
the secondary battery according to claim 1, wherein the secondary battery is disposed in the housing.

17. An apparatus using a secondary battery as a power source, the apparatus comprising the secondary battery according to claim 1, and the secondary battery is adapted to provide electrical energy.

* * * * *